(12) United States Patent
Yang et al.

(10) Patent No.: US 11,111,688 B2
(45) Date of Patent: Sep. 7, 2021

(54) THREE-DIMENSIONAL ROTATING INTELLIGENT STORAGE COMPARTMENT

(71) Applicant: BEIJING UNIVERSITY OF CIVIL ENGINEERING AND ARCHITECTURE, Beijing (CN)

(72) Inventors: Jianwei Yang, Beijing (CN); Dechen Yao, Beijing (CN); Tangbo Bai, Beijing (CN); Ziming Kou, Beijing (CN); Ran Sun, Beijing (CN); Chuan Liu, Beijing (CN); Zhifen Pang, Beijing (CN); Fang Wen, Beijing (CN)

(73) Assignee: BEIJING UNIVERSITY OF CIVIL ENGINEERING AND ARCHITECTURE, Beijing (CN)

( * ) Notice: Subject to any disclaimer, the term of this patent is extended or adjusted under 35 U.S.C. 154(b) by 0 days.

(21) Appl. No.: 16/493,298

(22) PCT Filed: Dec. 13, 2018

(86) PCT No.: PCT/CN2018/120772
§ 371 (c)(1),
(2) Date: Sep. 11, 2019

(87) PCT Pub. No.: WO2019/196470
PCT Pub. Date: Oct. 17, 2019

(65) Prior Publication Data
US 2021/0032890 A1   Feb. 4, 2021

(30) Foreign Application Priority Data

Apr. 8, 2018 (CN) .......................... 201810304889.0

(51) Int. Cl.
*E04H 6/42* (2006.01)
*E04H 6/00* (2006.01)
(Continued)

(52) U.S. Cl.
CPC ................ *E04H 6/005* (2013.01); *B62H 3/00* (2013.01); *E04H 6/182* (2013.01); *E04H 6/28* (2013.01);
(Continued)

(58) Field of Classification Search
CPC ......... E04H 6/005; E04H 6/424; E04H 6/422; E04H 6/14; E04H 6/18; E04H 6/182;
(Continued)

(56) References Cited

U.S. PATENT DOCUMENTS

| 1,788,155 A | * | 1/1931 | Geiger | ...................... E04H 6/14 |
| | | | | 414/248 |
| 1,815,738 A | * | 7/1931 | MacDonald | .............. E04H 6/14 |
| | | | | 414/248 |

(Continued)

FOREIGN PATENT DOCUMENTS

| CN | 105804462 A | * | 7/2016 |
| CN | 106988569 | | 7/2017 |

(Continued)

*Primary Examiner* — Michael Safavi (57) ABSTRACT

A three-dimensional rotating intelligent storage compartment is provided in the present invention, which includes a tower body, a center of the tower body being provided with a central garage for storing bicycles, the central garage including a central pillar. A plurality of layers of placement plates are arranged around the central pillar, and each layer of the placement plates is equally divided into a plurality of independent storage spaces by a longitudinal partitioning plate. A longitudinal edge on one side of the longitudinal partitioning plate is fixed to the central pillar; each storage space is provided with a clamping mechanism for clamping bicycle. An inner wall of the tower body is longitudinally provided with a plurality of loop tracks, each loop track is provided with a plurality of ferry parking spaces, which are movable within the loop track, is capable of clamping bicycle in a standing position and capable of pushing bicycle (Continued)

to the placement plate. The present invention can operate conveniently, and can save footprint area of bicycles.

6 Claims, 9 Drawing Sheets

(51) Int. Cl.
*E04H 3/00* (2006.01)
*B62H 3/00* (2006.01)
*E04H 6/18* (2006.01)
*E04H 6/28* (2006.01)
*G05B 19/4155* (2006.01)

(52) U.S. Cl.
CPC ......... *E04H 6/424* (2013.01); *G05B 19/4155* (2013.01); *G05B 2219/31275* (2013.01)

(58) Field of Classification Search
CPC ........... E04H 6/183; E04H 6/187; E04H 6/28; E04H 6/42; B62H 3/00
See application file for complete search history.

(56) References Cited

U.S. PATENT DOCUMENTS

| | | | | |
|---|---|---|---|---|
| 1,824,340 A | * | 9/1931 | Geiger | E04H 6/14 |
| | | | | 414/592 |
| 2,874,822 A | * | 2/1959 | Coursey | E04H 6/187 |
| | | | | 414/231 |
| 4,156,994 A | * | 6/1979 | Steuer | E04H 6/005 |
| | | | | 312/202 |
| 9,073,591 B2 | * | 7/2015 | Lee | E04H 6/005 |
| 2017/0264065 A1 | * | 9/2017 | Qi | E04H 6/187 |
| 2019/0153739 A1 | * | 5/2019 | Garcia, III | E04H 6/40 |
| 2020/0141147 A1 | * | 5/2020 | Mingyan | G06Q 30/0284 |

FOREIGN PATENT DOCUMENTS

| | | | | | |
|---|---|---|---|---|---|
| CN | 107401300 | A | * | 11/2017 | |
| CN | 107448025 | A | * | 12/2017 | |
| CN | 107806261 | | | 3/2018 | |
| CN | 107869266 | | | 4/2018 | |
| CN | 108316713 | A | * | 7/2018 | |
| CN | 108397000 | | | 8/2018 | |
| CN | 108505782 | | | 9/2018 | |
| CN | 109025415 | A | * | 12/2018 | |
| CN | 109441159 | A | * | 3/2019 | |
| CN | 108518100 | | | 9/2019 | |
| DE | 9111615 | U1 | * | 1/1993 | ............... E04H 6/14 |
| DE | 4130994 | A1 | * | 3/1993 | ............... E04H 6/14 |
| DE | 9308570 | U1 | * | 10/1994 | ............... E04H 6/005 |
| DE | 102007002393 | A1 | * | 7/2008 | ............... E04H 6/28 |
| DE | 202014105780 | U1 | * | 4/2015 | ............... E04H 6/005 |
| DE | 202016101921 | U1 | * | 6/2016 | ............... E04H 6/005 |
| GB | 270393 | A | * | 5/1927 | ............... E04H 6/14 |
| WO | WO-2010114080 | A1 | * | 10/2010 | ............... B62H 3/00 |
| WO | WO-2010150834 | A1 | * | 12/2010 | ............... B62H 3/00 |
| WO | WO-2017023168 | A1 | * | 2/2017 | ............... E04H 6/005 |
| WO | WO-2017091065 | A1 | * | 6/2017 | ............... E04H 6/005 |
| WO | WO-2018212381 | A1 | * | 11/2018 | ............... E04H 6/14 |
| WO | WO-2020242203 | A1 | * | 12/2020 | |

* cited by examiner

THREE-DIMENSIONAL ROTATING INTELLIGENT STORAGE COMPARTMENT

BACKGROUND OF THE INVENTION

Field of the Invention

The present invention relates to a three-dimensional rotating intelligent storage compartment, which belongs to the technical field of intelligent control.

Description of Related Art

At present, the road resources of large cities are very valuable, and the space available on the ground is getting less and less. For example, the cost of parking on the ground in the city is more than double that of the underground garage or other three-dimensional parking mode, which directly reflects the current situation for the road.

SUMMARY OF THE INVENTION

In order to solve the above problems, a three-dimensional rotating intelligent storage compartment is provided in the present invention. The specific technical solution of the three-dimensional rotating intelligent storage compartment is as follows.

The three-dimensional rotating intelligent storage compartment includes a tower body in a hollow cylinder shape, a center of the tower body being provided with a central garage for storing bicycles, the central garage having a cylindrical shape and including a central pillar; a plurality of layers of placement plates, arranged around the central pillar; wherein a spacing between adjacent upper and lower placement plates is greater than a height of a bicycle, and each layer of the placement plates is equally divided into a plurality of independent storage spaces by a longitudinal partitioning plate; a longitudinal edge on one side of the longitudinal partitioning plate is fixed to the central pillar, and a longitudinal edge on the opposite side is aligned with an edge of the placement plate; each storage space is provided with a clamping mechanism for clamping the bicycle; an inner wall of the tower body is longitudinally provided with a plurality of loop tracks, each loop track including two longitudinal straight segments parallel to each other, and a top arc transition segment and a bottom arc transition segment circularly connecting the two longitudinal straight segments; each loop track is provided with a plurality of ferry parking spaces, which are movable within the loop track, is capable of clamping the bicycle in a standing position and capable of pushing the bicycle to the placement plate; one longitudinal straight segment of the loop track faces the storage space; and the ferry parking space comprises a connection driving portion and a bicycle clamping slot, the connection driving portion being disposed in the loop track, side walls on both sides of the bicycle clamping slot being connected to the connection driving portion through a bearing; when the connection driving portion passes the top arc transition segment and the bottom arc transition segment, the connection driving portion is driven to advance in the loop track, the bicycle clamping slot rotates around the bearing, and an opening of the bicycle clamping slot is always maintained in a vertically upward state.

Preferably, each connection driving portion is provided with a drive motor that drives the connection driving portion to move within the loop track.

Preferably, a rack is laid in the loop track, and the connection driving portion is provided with a gear meshed with the rack, so that the drive motor drives the gear to rotate, and the gear moves on the rack, to realize a movement of the ferry parking space.

Preferably, an inner wall of the bicycle clamping slot is oppositely disposed with a moving rod, and the moving rod is moved on the inner wall of the bicycle clamping slot; the inner wall of the bicycle clamping slot is provided with a horizontal slot in a " ┼ " shape with a section extends to the edge thereof, and the section of the moving rod inserted in the horizontal slot has a "T" shape; one end of the moving rod facing the central pillar is fixedly provided with a limiting block, and the limiting block is located at an opposite side of the moving rod facing an opening of the horizontal slot; two gear discs are disposed above or below the horizontal slot, and the two gear discs are respectively located on horizontal sides of the horizontal slot; the two gear discs are tightly sleeved with a chain, and the chain passes through a horizontal slot channel on an opposite side of the opening of the horizontal slot and fixed with the limiting block, one surface of the horizontal slot facing an outer side of the bicycle clamping slot is provided with a baffle, and the baffle only blocks the limiting block to allow the chain and a clamping rod to pass; and the gear disc is driven by a driver disposed at a corner of the inner wall of the bicycle clamping slot.

Preferably, the moving rod is connected to two clamping arms through a cylinder, and the clamping arms are parallel to the moving rod; the cylinder is perpendicular to the clamping arms, and is capable of pushing the clamping arms toward a middle of the bicycle clamping slot; after the two clamping arms move toward each other, the bicycle is clamped to stand from both sides of the bicycle.

Preferably, the clamping mechanism includes a movable clamping plate disposed on an opposite side of the longitudinal partitioning plate in the storage space, and the movable clamping plate is connected to the longitudinal partitioning plate by at least two telescopic rods; the telescopic rod is horizontally extended to push the movable clamping plate out, and the two movable clamping plates are moved closer to each other to clamp the bicycle.

Preferably, a top of the tower body is provided with a top cover, and a top of the central garage is provided with a apical plate; the apical plate extends toward and is fixed to the inner wall of the tower body, and is provided with a channel for the ferry parking space to pass; the central pillar extends from a center of the apical plate and extends upward to contact the top cover; the central pillar is provided with a pickup button, a storage button, a numeric button and a display screen, each storage space is assigned a corresponding serial number, and the display screen is used to display the serial number of the storage space where the parking is located; and a door allowing passage of people and bicycles is provided around the tower body.

The beneficial effects of the present invention are as follows.

In the present invention, sensors are provided in multiple places, are used to activate or stop the corresponding activities, and there is a linkage or feedback relationship between them to realize automatic interlocking action, so that in the underground with unmanned control, the operation of storing and picking up the bicycle is executed successively to achieve automatic control.

In the present invention, parking the bicycle into the three-dimensional bicycle tower saves the standing space, which can realize automatic storage and pickup, and is convenient to operate and saves time.

Aspects of the present invention are best understood from the following detailed description when read with the accompanying figures.

LIST OF SERIAL NUMBERS IN THE FIGURES

1 Tower body
2 Loop track
3 Ferry parking space
4 Placement plate
5 Central pillar
6 Channel
7 Apical plate
8 Clamping mechanism
9 Storage space
10 Connection driving portion
11 Bicycle clamping slot
12 Clamping arm
13 Cylinder
14 Moving rod
15 Limiting block
16 Horizontal slot
17 Gear disc
18 Motor
19 Chain
20 Clamping plate
21 Telescopic rod
22 Longitudinal partitioning plate

DESCRIPTION OF THE INVENTION

The technical solution in the embodiments of the present invention will be clearly and completely described hereafter in connection with drawings of specific embodiments of the present invention.

As shown in FIGS. 1 to 9, a three-dimensional rotating intelligent storage compartment includes a tower body 1 in a hollow cylinder shape, a center of the tower body 1 being provided with a central garage for storing bicycles, the central garage having a cylindrical shape and including a central pillar 5. A plurality of layers of placement plates 4 are arranged around the central pillar 5; a spacing between adjacent upper and lower placement plates 4 is greater than a height of a bicycle, and each layer of the placement plates 4 is equally divided into a plurality of independent storage spaces 9 by a longitudinal partitioning plate 22. A longitudinal edge on one side of the longitudinal partitioning plate 22 is fixed to the central pillar 5, and a longitudinal edge on the opposite side is aligned with an edge of the placement plate 4; each storage space 9 is provided with a clamping mechanism 8 for clamping the bicycle.

An inner wall of the tower body 1 is longitudinally provided with a plurality of loop tracks 2, wherein the loop tracks 2 include two longitudinal straight segments parallel to each other, and a top arc transition segment and a bottom arc transition segment circularly connect the two longitudinal straight segments. Each loop track 2 is provided with a plurality of ferry parking spaces 3, the ferry parking spaces 3 being movable within the loop track 2, the ferry parking spaces 3 capable of clamping the bicycle in a standing position and capable of pushing the bicycle to the placement plate 4. The bicycle is clamped into the clamping mechanism 8 within the storage space 9.

Figure 2:
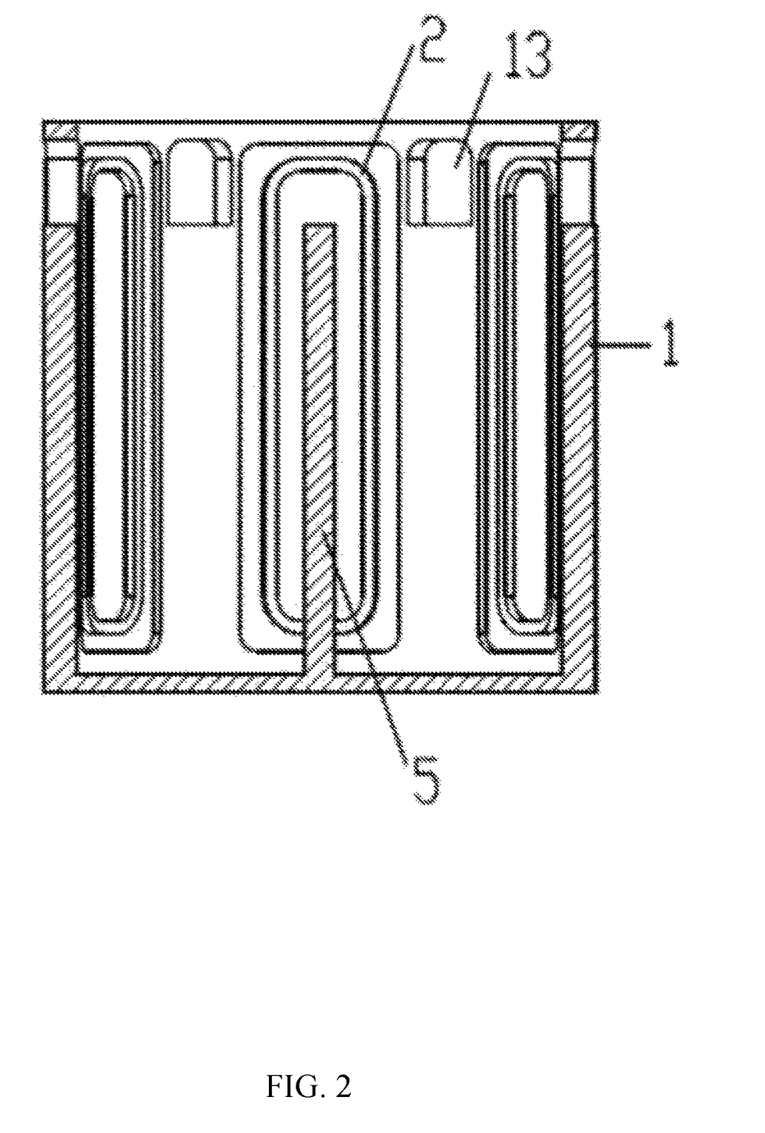
FIG. 2 is a cross-sectional view of a structure of a compartment body of the present invention.
Figure 3:
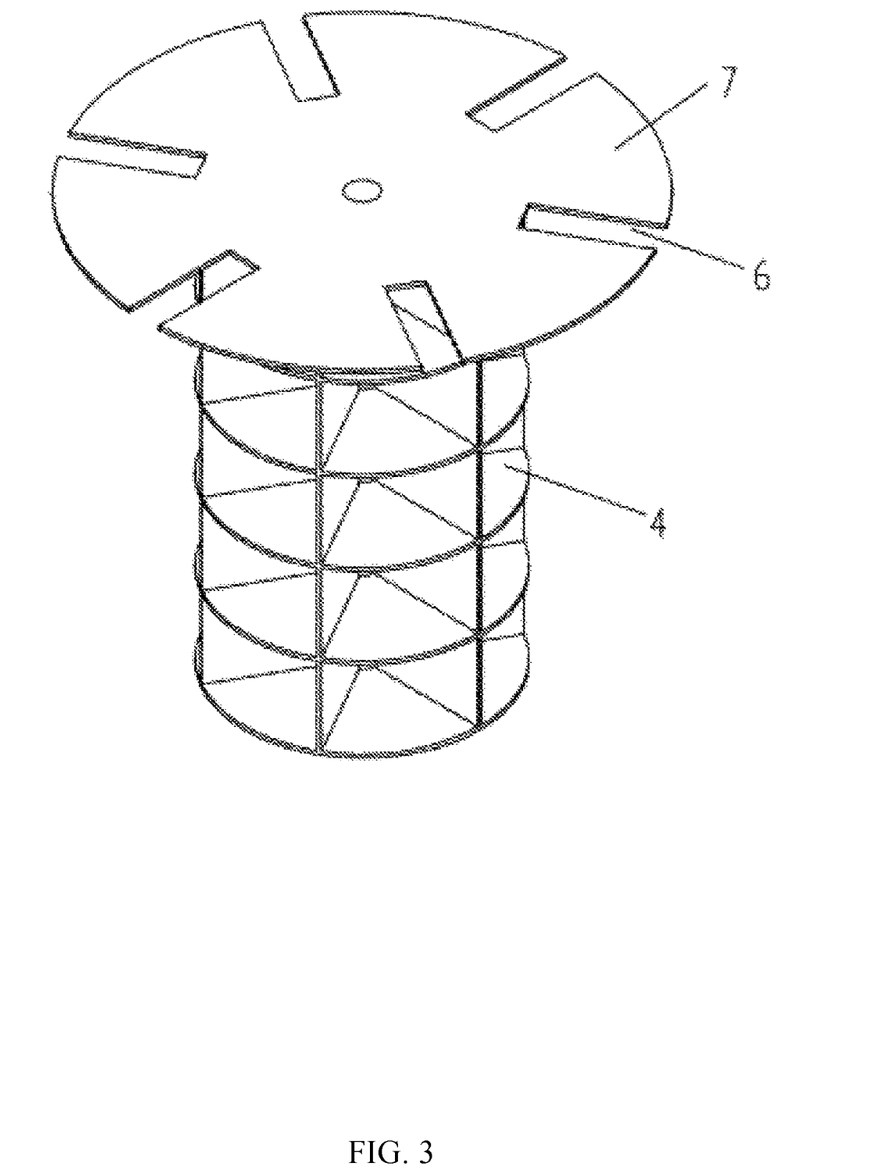
FIG. 3 is a structural diagram of a central garage of the present invention.

One longitudinal straight segment of the loop track 2 faces the storage space 9.

Figure 6:
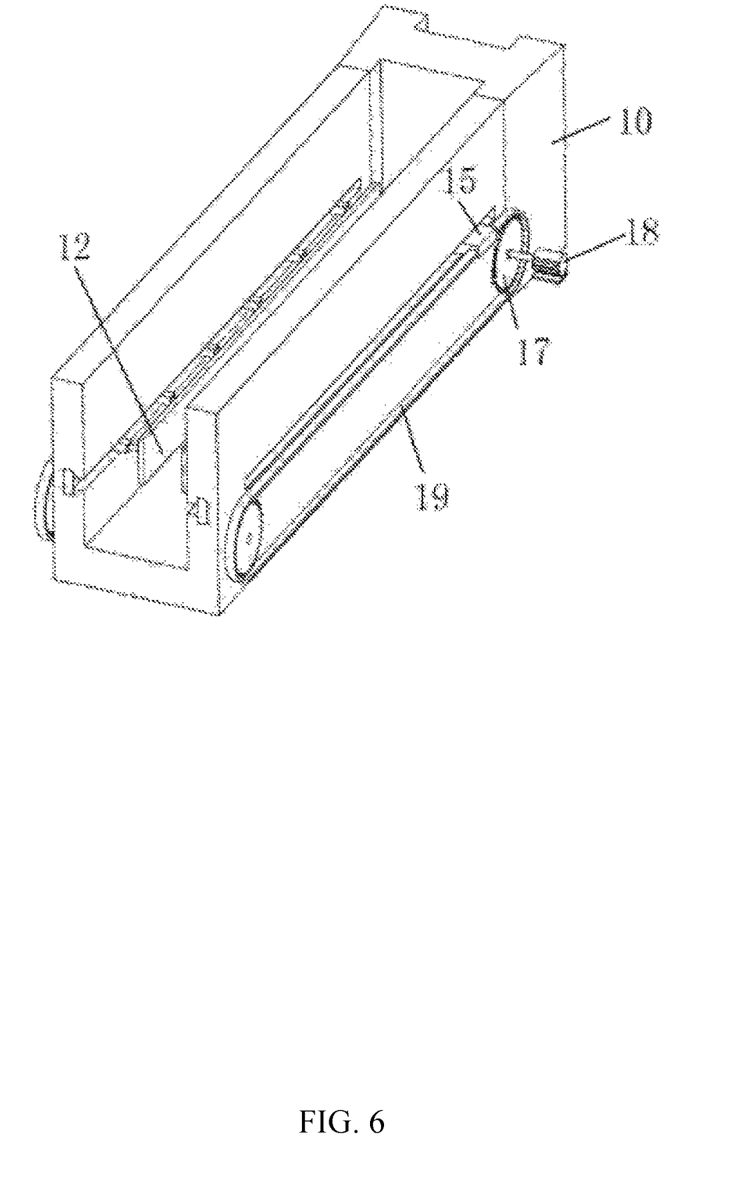
FIG. 6 is a structural diagram of a ferry parking space of the present invention.
Figure 7:
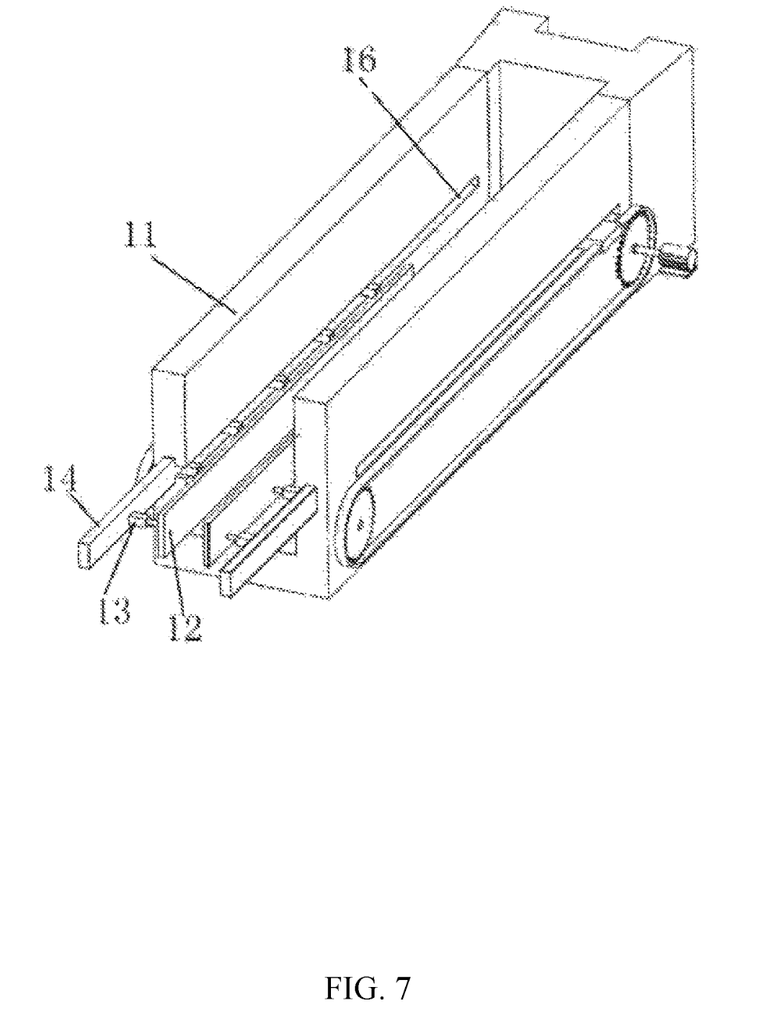
FIG. 7 is a diagram showing the status that a moving rod in FIG. 6 is extended.

The ferry parking space 3 includes a connection driving portion 10 and a bicycle clamping slot 11, the connection driving portion 10 being disposed in the loop track 2, side walls on both sides of the bicycle clamping slot 11 being connected to the connection driving portion 10 through a bearing. When the connection driving portion 10 passes the top arc transition segment and the bottom arc transition segment, the connection driving portion 10 is driven to advance in the loop track 2, the bicycle clamping slot 11 rotates around the bearing, and a side of the bicycle clamping slot 11 clamping the bicycle always faces upward.

Each connection driving portion 10 is provided with a drive motor that drives the connection driving portion 10 to move within the loop track 2.

A rack is laid in the loop track 2, and the connection driving portion 10 is provided with a gear meshed with the rack, so that the drive motor drives the gear to rotate, and the gear moves on the rack, to realize the movement of the bicycle clamping slot 11.

Figure 8:
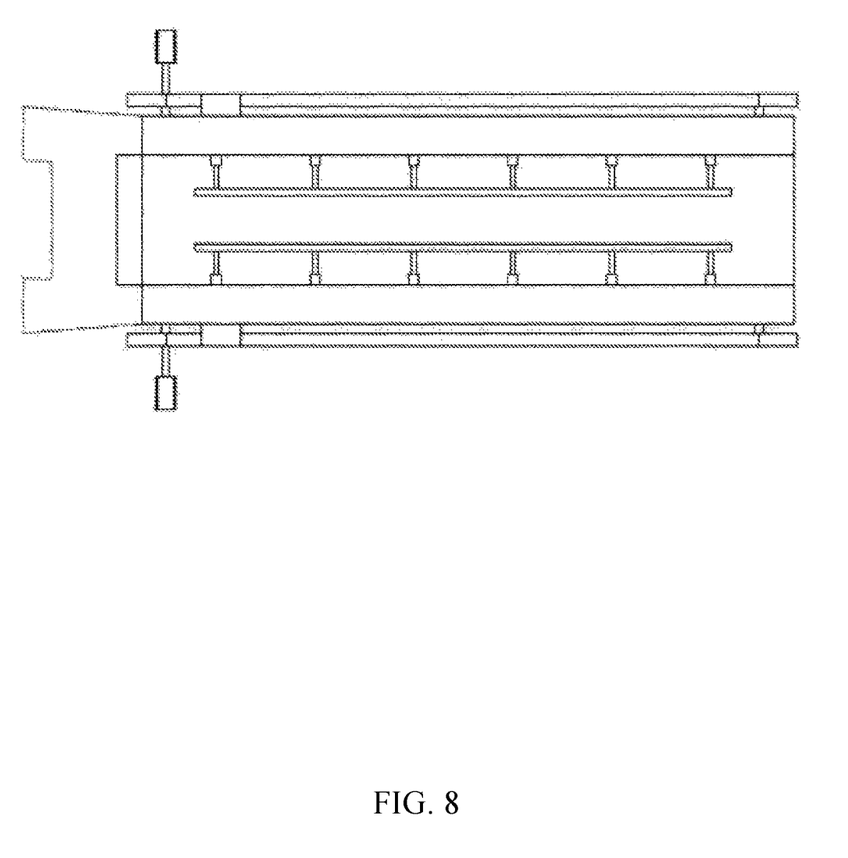
FIG. 8 is a top view of FIG. 6.

An inner wall of the bicycle clamping slot 11 is oppositely disposed with a moving rod 14, and the moving rod 14 may move on the inner wall of the bicycle clamping slot 11; the inner wall of the bicycle clamping slot 11 is provided with a horizontal slot 16 in a " + " shape with a section extends to the edge thereof, and the section of the moving rod 14 inserted in the horizontal slot 16 has a "T" shape.

One end of the moving rod 14 facing the central pillar 5 is fixedly provided with a limiting block 15, and the limiting block 15 is located at an opposite side of the moving rod 14 facing an opening of the horizontal slot 16; the limiting block 15 cooperates with the clamping rod 12 to fill the section of the horizontal slot 16 of the " + " shape.

Two gear discs 17 are disposed above or below the horizontal slot 16, and the two gear discs 17 are respectively located on the horizontal sides of the horizontal slot 16; the two gear discs 17 are tightly sleeved with a chain 19, and the chain 19 passes through a channel of the horizontal slot 16 on the opposite side of the opening of the horizontal slot 16, and the limiting block 15 is fixed with the chain 19, one surface of the horizontal slot 16 facing an outer side of the bicycle clamping slot 11 is provided with a baffle, and the baffle only blocks the limiting block 15 to allow the chain 19 and the clamping rod 12 to pass.

The gear disc 17 is driven by a driver disposed at a corner of the inner wall of the bicycle clamping slot 11.

The moving rod 14 is provided with a clamping arm 12 through a cylinder 13, and the clamping arm 12 is parallel to the moving rod 14; the cylinder 13 is perpendicular to the clamping arm 12, and is capable of pushing the clamping arm 12 toward the middle of the bicycle clamping slot 11. After the two clamping arms 12 move toward each other, the bicycle is clamped to stand from both sides of the bicycle; one of the clamping arms 12 is provided at both ends thereof with two parallel protective plates perpendicular to the clamping arm 12, which is used to prevent the bicycle from being detached from the clamping arms 12 during the movement process of moving the bicycle from the bicycle clamping slot 11 to the storage space 9, or moving the bicycle from the storage space 9 to the bicycle clamping slot 11.

Figure 4:
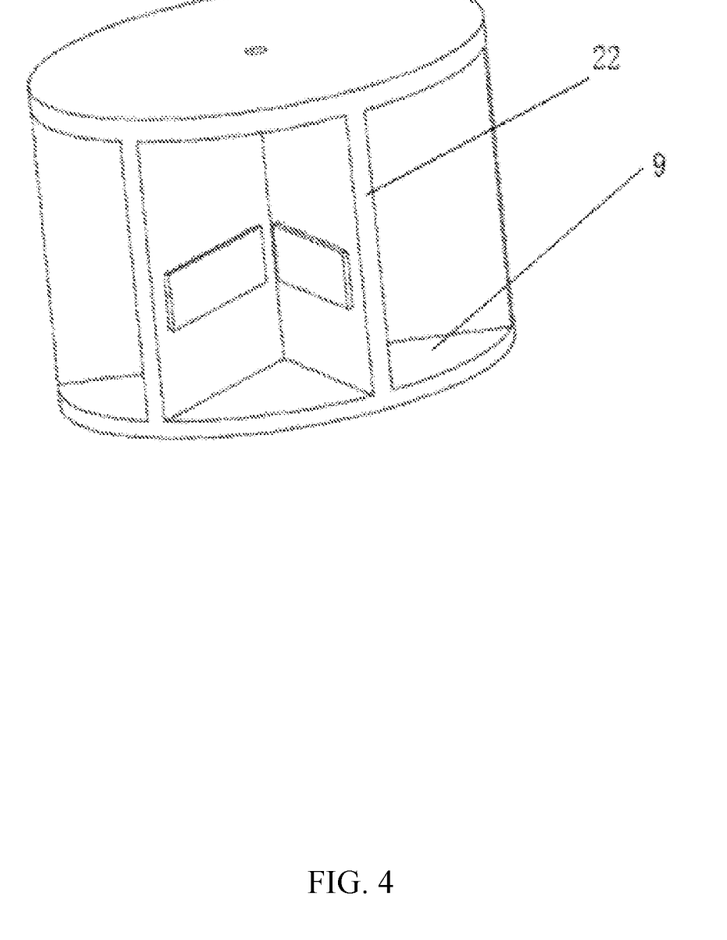
FIG. 4 is a structural diagram of a storage space of a central garage of the present invention.
Figure 5:
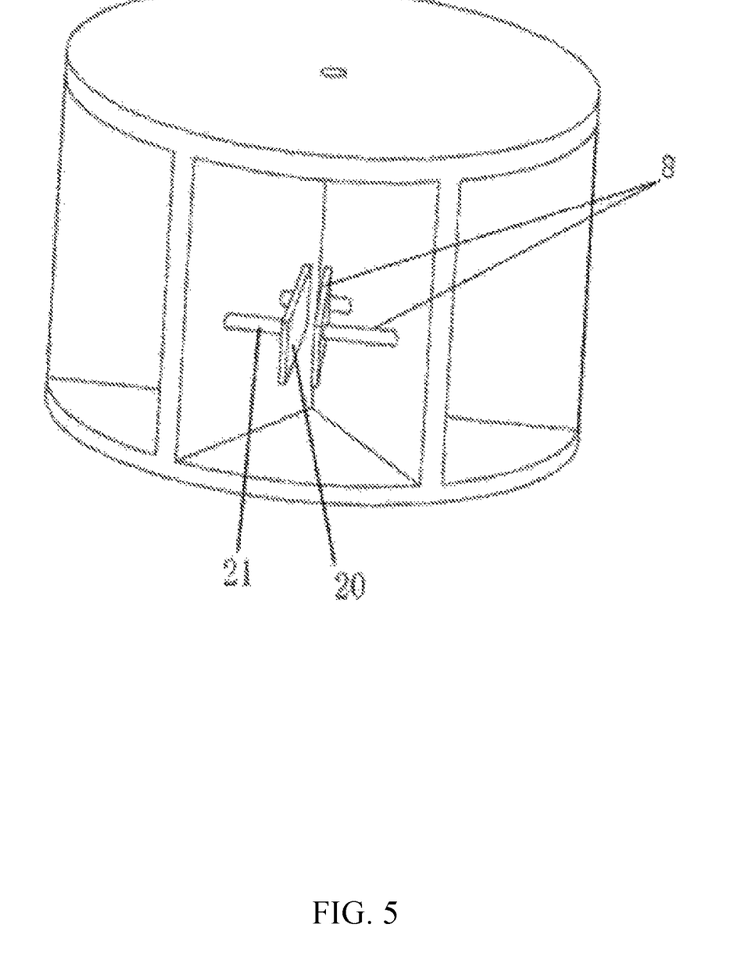
FIG. 5 is a diagram showing the status that a clamping plate in FIG. 4 is extended.

The clamping mechanism 8 includes a movable clamping plate 20 disposed on the opposite side of the longitudinal partitioning plate 22 in the storage space 9, and the clamping plate 20 is connected to the longitudinal partitioning plate 22 by at least two telescopic rods 21; the telescopic rod 21 may be horizontally extended to push the clamping plate 20 out, and the two clamping plates 20 are moved closer to each other to clamp the bicycle.

When the bicycle is transferred from the ferry parking space 3 to the storage space 9, the clamping plate 20 and the clamping arm 12 simultaneously clamp the bicycle, and the clamping plate 20 and the clamping arm 12 are staggered up and down without contact.

Figure 9:
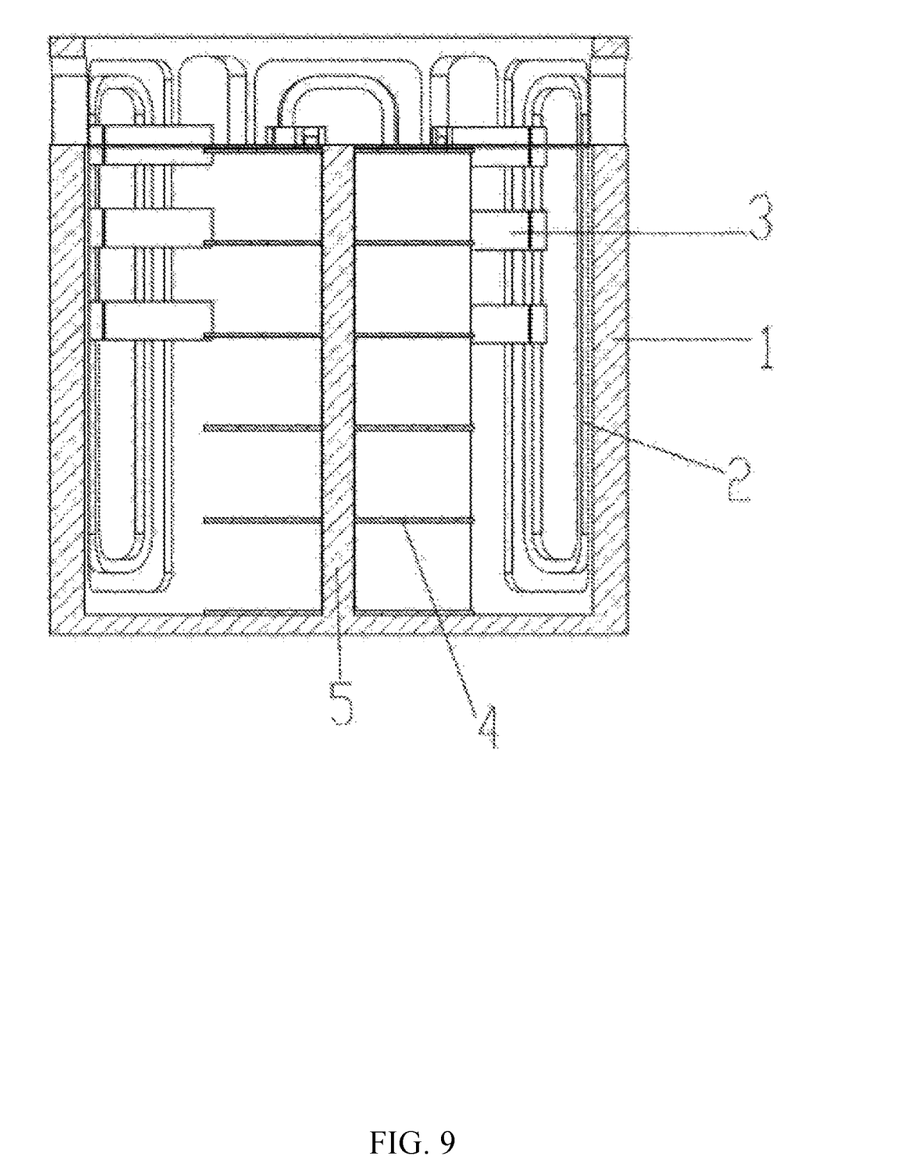
FIG. 9 is an overall longitudinal sectional view of the present invention.

A top of the tower body 1 is provided with a top cover; the top arc transition segment of the loop track 2 is located above the top level of the central garage, and the bottom arc transition segment of the loop track 2 is located below the bottom level of the central garage.

The topmost apical plate 7 of the central garage extends toward the inner wall of the tower body 1 and is fixed to the inner wall of the tower body 1, and the apical plate 7 is provided with a channel 6 for passing the ferry parking space 3; the central pillar 5 extends from the center of the apical plate 7 and extends upward to contact the top cover; the central pillar 5 above the apical plate 7 is provided with a pickup button, a storage button, a numeric button and a display screen. Each storage space 9 is assigned a corresponding serial number, and the display screen is used to display the serial number of the storage space 9 where the parking is located.

Figure 1:
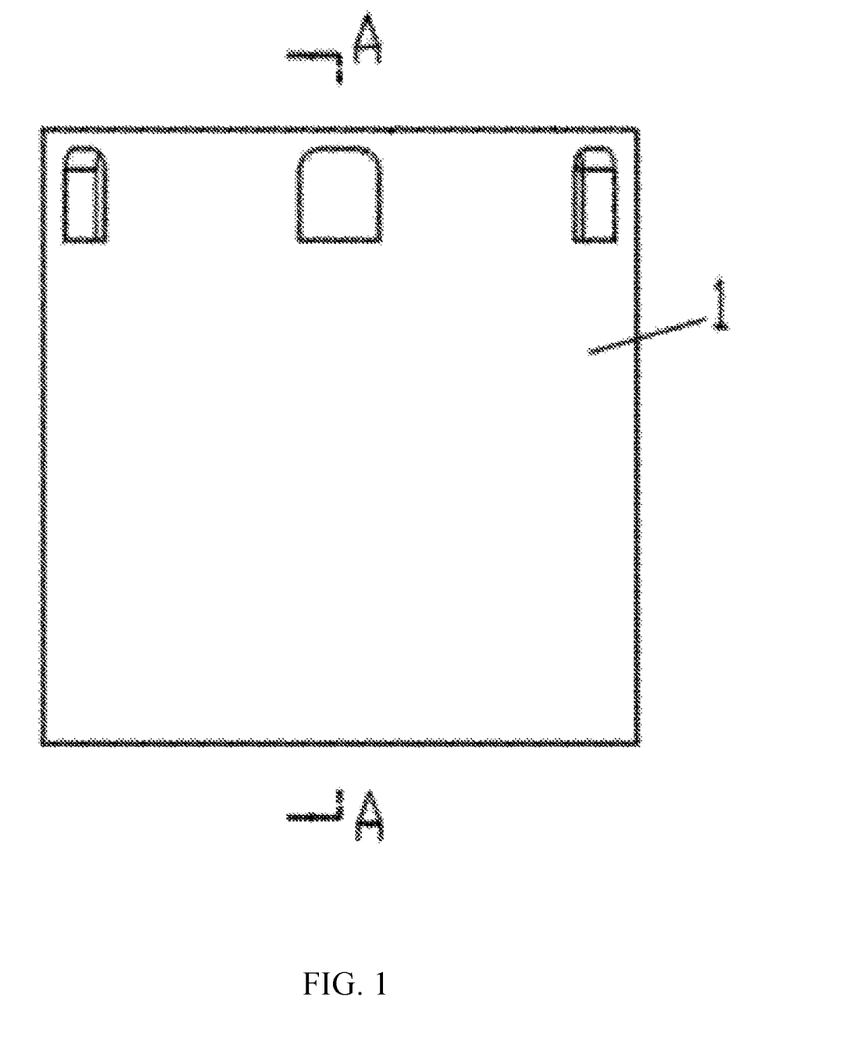
FIG. 1 is a schematic diagram showing an external structure of a tower body of the present invention.

A door allowing the passage of people and bicycles is provided around the tower body 1, and the door has the same height as the apical plate 7.

The present invention further includes a control system including a main controller disposed in the central pillar 5 and an on-off controller disposed in each drive motor and the drive. The main controller is wirelessly connected to each on-off controller via Bluetooth, and the main controller is capable of wirelessly controlling each on-off controller and recording whether there is a bicycle in each storage space 9.

When the main controller does not receive any command, the ferry parking spaces 3 on each of the loop tracks 2 are sequentially arranged on one side of the loop track 2.

When someone clicks the storage button, the main controller receives a parking command and analyzes whether there is free storage space 9. If there is any free storage space 9, in the order from top to bottom, the main controller drives one ferry parking space 3 to climb to the apical plate 7. Subsequently, the user places the bicycle in the bicycle clamping slot 11, and clicks the storage button again after the bicycle is fixed, so that the main controller drives the ferry parking space 3 to move to a nearby free storage space 9 and displays a serial number of the storage space 9 on the display screen, which is remembered by the user.

When the pickup button is clicked, the main controller receives a pickup command, and the display and the numeric button are activated; the serial number of the storage space 9 is input to the main controller by clicking the numeric button, the number is displayed on the display, and the main controller drives the corresponding ferry parking space 3 to pick up the bicycle on the storage space 9.

The bicycle storing method of the intelligent storage compartment is as follows:

When it is necessary to park the bicycle, first, the bicycle is brought to the apical plate 7, and then, by clicking the storage button, the three-dimensional rotating intelligent storage compartment starts to initiate; determining whether the storage space 9 is free: the control system receives a parking demand on the apical plate 7, and finds whether there is a free storage space 9; if not, "the parking space is full" is displayed on the display screen; and if so, a free storage space 9 is selected while displaying the serial number of the storage space 9 on the display screen.

The uppermost one of the ferry parking spaces 3 in the corresponding loop track 2 of the storage space 9 is initiated, and the control system initiates the drive motor of the ferry parking space 3 to drive the gear of the ferry parking space 3 to rotate and crawl on the rack until the ferry parking space 3 runs above the apical plate 7 and bypasses the top arc transition segment of the loop track 2 for being flush with the apical plate 7 and stopping.

Each loop track 2 passes through the apical plate 7 twice. The apical plate 7 is provided with two channels 6 for the ferry parking space 3 to pass, wherein the track in one of the channels 6 is located directly in front of the storage space 9, and the channel 6 is provided with a sensor. When the ferry parking space 3 is located in the channel 6, the drive motor of the ferry parking space 3 is stopped to be parked in the channel 6, and the longitudinal straight segment of the loop track 2 corresponding to the other channel 6 is a standby waiting stop of the ferry parking space 3. When the ferry parking spaces 3 on the loop track 2 are on standby, they are sequentially stopped in the longitudinal straight segment. When there is a storage command, all the ferry parking spaces 3 are either clockwise or counterclockwise running on the loop track 2. When the topmost ferry parking space 3 starting to work, all other standby ferry parking spaces 3 move upwards to the corresponding height of the parking space, and are sequentially placed below the standby ferry parking spaces after the working ferry parking space completes the work.

The user stands outside the stable ferry parking space 3 and holds the bicycle to stand, then clicks the storage button to initiate the clamping arm 12; the clamping arm 12 moves close to each other until the bicycle is clamped; and when the user releases the hand, the bicycle may stand on its own in the bicycle clamping slot.

When the drive motor works, the ferry parking space 3 moves downwards to a designated storage space 9; then the drive works, the moving rod 14 is extended out to feed the bicycle into the storage space 9; and when the clamping arm 12 senses the bicycle, the clamping arms 12 are initiated to move toward each other to clamp the bicycle, and when the clamp arm 12 is retracted, the moving rod 14 is also moved back into the bicycle clamping slot 11.

The side walls on both sides of the storage space 9 are provided with a sensor, which may sense that a bicycle is moved to the storage space 9. When the sensor senses that there is a bicycle, the controller of the clamping arms 12 is actuated to move the clamping arms 12 toward each other until the two clamping arms 12 clamp and fix the bicycle from both sides.

The side surface of the clamping arm 12 facing the clamping arm 12 is provided with a sensor whose sensing section is a vertically upward or vertical downward area. When the sensor senses the clamping arms 12, indicating that the clamping arms 12 have clamped the bicycle, the sensor activates the clamping arms 12 to retract, and the moving rod 14 to retract.

After the clamping arm 12 is attached to the moving rod 14 and the moving rod 14 is completely retracted into the bicycle clamping slot 11, the ferry parking spaces 3 are arranged in sequence clockwise or counterclockwise below the other ferry parking spaces 3, and are parked in the longitudinal straight segment of the loop track 2 on the standby side.

The bicycle pickup methods are as follows:

When the pickup button is clicked, the serial number of the storage space 9 parked by the bicycle is input on the display screen, and the control system activates the lowest ferry parking space 3 in the loop track 2 corresponding to the storage space 9. At this time, the running direction of the ferry parking space 3 is opposite to that when the bicycle is stored. The ferry parking space 3 is moved to the corresponding storage space 9, and the moving rod 14 extends into the storage space 9; and when the moving rod 14 protrudes until the limiting block 15 abuts against the baffle, the moving rod 14 stops moving to activate the clamping arm 12, and the clamping arms 12 move toward each other until the sensor on the clamping arms 12 sense the clamping plate to activate the clamping plate to retract and to activate the moving rod 14 to retract. When the moving rod 14 is completely retracted into the bicycle clamping slot 11, the ferry parking space 3 is activated to rise until it is flush with the apical plate 7 for parking; after parking to be stable, the clamping arms 12 are retracted, and the user takes the bicycle away and clicks the pickup button again so that the ferry parking space 3 is activated to bypass the top arc segment of the loop track 2 and descend to the standby waiting point of the ferry parking space 3.

Both ends of the limiting block 15 are provided with a contact sensor. When the moving rod 14 stops moving forward, the contact sensor contacts the baffle, and the moving rod 14 stops moving. When the moving rod 14 is retracted into the bicycle parking slot, the moving rod 14 stops moving upon the contact sensor contacting the inner wall of the horizontal slot 16.

In the present invention, the bicycle is placed in the storage space 9, and the bicycle stands by the clamping mechanism 8, so that it' convenient for the ferry parking space 3 to pick up the bicycle.

The ferry parking space 3 moves in the loop track 2, so that the bicycle may be picked up and stored. There is a plurality of ferry parking spaces 3 in one loop track 2. When the tower body 1 is high and the number of storage spaces 9 is huge, a plurality of ferry parking spaces 3 work at the same time, shortening the waiting time of the user, and improving the efficiency of storing and picking up the bicycle.

The two longitudinal straight segments are connected by the top arc transition section and the bottom arc transition section to form a complete loop, so that the ferry parking space 3 may be periodically moved on the loop track 2 to prevent mutual collision and contact.

The provision of the bearings ensures that the opening of the bicycle clamping slot 11 is always oriented up by the weight of the bicycle clamping slot 11. When the connection driving portion 10 is moved to the top arc transition segment and the bottom arc transitional segment, the bicycle clamping slot 11 rotates around the bearing under its own weight, and the opening is always oriented up.

The gear moves on the rack to move the bicycle clamping slot 11. Each drive motor works independently.

The technical means disclosed in the present invention is not limited to the technical means disclosed above, and includes a technical solution composed of any combination of the above technical features.

In view of the above-described ideal embodiments of the present invention, through above description, various changes and modifications may be made by those skilled in the art without departing from the scope of the present invention. The technical scope of the present invention is not limited to the contents of the specification, and the technical scope thereof must be determined according to the scope of the claims.

INDUSTRIAL APPLICABILITY

In the present invention, sensors are provided in multiple places, are used to activate or stop the corresponding activities, and there is a linkage or feedback relationship between them to realize automatic interlocking action, so that in the underground with unmanned control, the operation of storing and picking up the bicycle is executed successively to achieve automatic control.

In the present invention, parking the bicycle into the three-dimensional bicycle tower saves the standing space, which can realize automatic storage and pickup, and is convenient to operate and saves time.

What is claimed is:

1. A three-dimensional rotating intelligent storage compartment, comprising:
   a tower body in a hollow cylinder shape, a center of the tower body being provided with a central garage for storing bicycles, the central garage having a cylindrical shape and including a central pillar;
   a plurality of layers of placement plates, arranged around the central pillar; wherein a spacing between adjacent upper and lower placement plates is greater than a height of a bicycle, and each layer of the placement plates is equally divided into a plurality of independent storage spaces by a longitudinal partitioning plate; a longitudinal edge on one side of the longitudinal partitioning plate is fixed to the central pillar, and a longitudinal edge on the opposite side is aligned with an edge of the placement plate; each storage space is provided with a clamping mechanism for clamping the bicycle; an inner wall of the tower body is longitudinally provided with a plurality of loop tracks, each loop track including two longitudinal straight segments parallel to each other, and a top arc transition segment and a bottom arc transition segment circularly connecting the two longitudinal straight segments;
   each loop track is provided with a plurality of ferry parking spaces, which are movable within the loop track, is capable of clamping the bicycle in a standing position and capable of pushing the bicycle to the placement plate;
   one longitudinal straight segment of the loop track faces the storage space; and
   the ferry parking space comprises a connection driving portion and a bicycle clamping slot, the connection driving portion being disposed in the loop track, side walls on both sides of the bicycle clamping slot being connected to the connection driving portion through a bearing;

when the connection driving portion passes the top arc transition segment and the bottom arc transition segment, the connection driving portion is driven to advance in the loop track, the bicycle clamping slot rotates around the bearing, and an opening of the bicycle clamping slot is always maintained in a vertically upward state;

wherein an inner wall of the bicycle clamping slot is oppositely disposed with a moving rod, and the moving rod is moved on the inner wall of the bicycle clamping slot; the inner wall of the bicycle clamping slot is provided with a horizontal slot in a " ┼ " shape with a section extends to the edge thereof, and the section of the moving rod inserted in the horizontal slot has a "T" shape;

one end of the moving rod facing the central pillar is fixedly provided with a limiting block, and the limiting block is located at an opposite side of the moving rod facing an opening of the horizontal slot;

two gear discs are disposed above or below the horizontal slot, and the two gear discs are respectively located on horizontal sides of the horizontal slot; the two gear discs are tightly sleeved with a chain, and the chain passes through a horizontal slot channel on an opposite side of the opening of the horizontal slot and fixed with the limiting block, one surface of the horizontal slot facing an outer side of the bicycle clamping slot is provided with a baffle, and the baffle only blocks the limiting block to allow the chain and a clamping rod to pass; and the gear disc is driven by a driver disposed at a corner of the inner wall of the bicycle clamping slot.

2. The three-dimensional rotating intelligent storage compartment according to claim 1, wherein each connection driving portion is provided with a drive motor that drives the connection driving portion to move within the loop track.

3. The three-dimensional rotating intelligent storage compartment according to claim 2, wherein a rack is laid in the loop track, and the connection driving portion is provided with a gear meshed with the rack, so that the drive motor drives the gear to rotate, and the gear moves on the rack, to realize a movement of the ferry parking space.

4. The three-dimensional rotating intelligent storage compartment according to claim 1, wherein the moving rod is connected to two clamping arms through a cylinder, and the clamping arms are parallel to the moving rod; the cylinder is perpendicular to the clamping arms, and is capable of pushing the clamping arms toward a middle of the bicycle clamping slot; after the two clamping arms move toward each other, the bicycle is clamped to stand from both sides of the bicycle.

5. The three-dimensional rotating intelligent storage compartment according to claim 4, wherein the clamping mechanism includes a movable clamping plate disposed on an opposite side of the longitudinal partitioning plate in the storage space, and the movable clamping plate is connected to the longitudinal partitioning plate by at least two telescopic rods; the telescopic rod is horizontally extended to push the movable clamping plate out, and the two movable clamping plates are moved closer to each other to clamp the bicycle.

6. The three-dimensional rotating intelligent storage compartment according to claim 1, wherein a top of the tower body is provided with a top cover, and a top of the central garage is provided with a apical plate; the apical plate extends toward and is fixed to the inner wall of the tower body, and is provided with a channel for the ferry parking space to pass; the central pillar extends from a center of the apical plate and extends upward to contact the top cover; the central pillar is provided with a pickup button, a storage button, a numeric button and a display screen, each storage space is assigned a corresponding serial number, and the display screen is used to display the serial number of the storage space where the parking is located; and a door allowing passage of people and bicycles is provided around the tower body.

\* \* \* \* \*